United States Patent Office 2,693,457
Patented Nov. 2, 1954

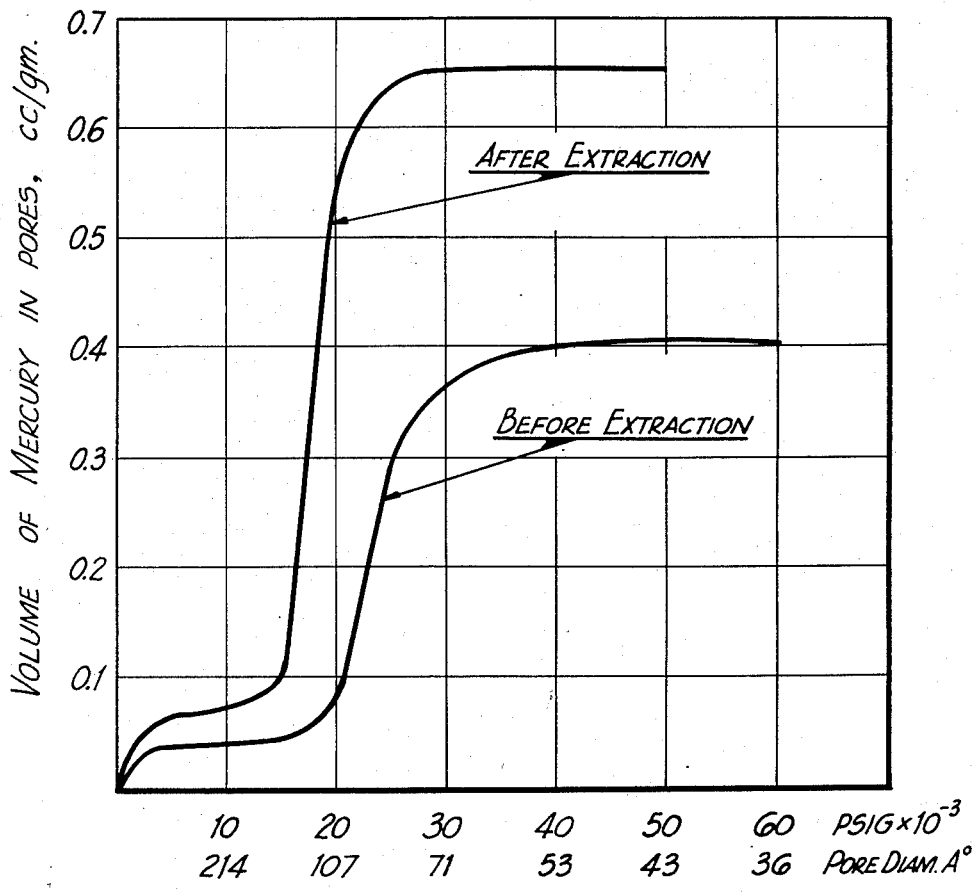

2,693,457

TREATMENT OF POROUS SOLIDS

Leonard C. Drake, Wenonah, and Robert L. Smith, Pitman, N. J., assignors to Socony-Vacuum Oil Company, Incorporated, a corporation of New York Application May 10, 1952, Serial No. 287,216

7 Claims. (Cl. 252—455)

This invention relates to a method for effecting a change in the surface characteristics of porous solids. More particularly, the present invention is directed to a process wherein solid porous metal oxide compositions are treated to produce a more porous material having a larger pore volume, increased surface area, and pores with increased average diameter.

Surface properties and particularly surface area, pore volume, and pore-size distribution are all-important characteristics in the application of many porous solids, especially where the latter are to be employed in adsorbent or catalytic processes. Methods and means for changing these related properties are few in number and for practical purposes are limited either to heat and steam treatment at elevated temperatures or to leaching methods in which soluble compounds are formed and removed. Thus, inorganic acid solutions have been used for removing one or more components of natural clays to increase their porosity and internal surface area. In this regard, the acid activation of bentonitic clays to produce decolorizing clays and cracking catalysts is well known. Aqueous solutions of organic acids, such as oxalic and acetic, have also been used. Likewise, organic and inorganic acids found in some surface waters are supposed to have leached some minerals to produce the naturally active clays, such as fuller's earth.

Acid extraction of porous solids, however, has certain disadvantages, particularly where the material undergoing treatment is in the form of particles of substantially uniform size and shape. As will be apparent, retention of original particle size and shape is advantageous and desirable in many applications. In leaching porous metal oxide pellets with acid solutions, it has been found that the pellets gradually get smaller as the leaching proceeds. There is also a greater tendency for acid-leached pellets to disintegrate. In the case of alumina pellets which are not soluble in mineral acids, treatment with aqueous alkalies to alter the surface characteristics of the alumina has shown that the alumina is attacked and solubilized and that there is a pronounced tendency for the pellets to disintegrate and form a mud before appreciable alumina is dissolved.

It is a major purpose of this invention to provide a method for altering the surface characteristics of porous solids in which the disadvantages inherent in prior art leaching processes are absent. It is a further object of the invention to afford an improved method for increasing the surface area of porous metal oxide compositions. A still further object is the provision of a method for leaching porous particles of substantially uniform size and/or shape without appreciable alteration in said size and/or shape.

The above and other objects which will be apparent to those skilled in the art are achieved in accordance with the present invention. Broadly, the process described herein contemplates leaching porous solids with acetylacetone, to yield products of greater porosity, increased surface area and having pores with increased average diameter. It has been found that acetylacetone is particularly effective in treating uni- or polycomponent porous metal oxide compositions.

Contact between the porous solid undergoing treatment and acetylacetone may be effected in any desired manner. Thus, treatment may be carried out either batch-wise, in which case the solid is permitted to remain in contact with the acetylacetone under generally static conditions for a predetermined length of time and then removed therefrom, or treatment may be effected by continuously percolating acetylacetone through a bed of the porous solid. Contact may also be effected using countercurrent extraction or multiple extractions with calcination of the treated solid between successive extractions. The time and temperature of treatment are interrelated variables. The proper selection of time and temperature of treatment will depend on the nature of the porous solid being treated, on the extent of change in surface characteristics desired, and on the choice of one of these variables. Thus, if it is desired to complete the treatment in a relatively short period of time, the temperature at which treatment is carried out should be relatively high. On the other hand, if a comparatively low treating temperature is employed, a correspondingly longer period of time will be required to achieve comparable surface alteration. In view of the foregoing, it is extremely difficult to establish the exact limiting conditions under which acetylacetone treatment will be carried out in any particular instance. In general, however, the time of treatment under the conditions of the invention is ordinarily at least about one hour and may extend over a considerable period, ordinarily not exceeding about 24 hours. The temperature of treatment may range from about 60° F. upwards and usually will not be greater than about 400° F. It has been found that a convenient method of leaching the porous solid is to bring the same into contact with acetylacetone under refluxing conditions, in which case the temperature will be the boiling point of acetylacetone, namely, 284° F.

The amount of acetylacetone employed is sufficient to accomplish leaching of the porous solid. The weight ratio of acetylacetone to solid undergoing treatment will generally be in the range of 1/1 to 10/1. The porous solids contacted with acetylacetone are in a substantially dry condition. Uncalcined materials were found to undergo surface change upon contact with acetylacetone at a more rapid rate than the corresponding calcined materials. Severely heat treated materials, on the other hand, were found to undergo surface alteration more slowly upon contact with acetylacetone under comparable treating conditions.

It would appear that the ability of acetylacetone to remove a portion of metal oxide from the porous solid undergoing treatment therewith is predicated upon the chelating characteristics of acetylacetone, that is, the ability of acetylacetone to form chelate compounds with the metal components of the porous solids undergoing treatment with resultant formation of metal acetylacetonates. It is thus within the purview of this invention to alter the surface properties of solid porous compositions having metal components capable of chelation with the acetylacetone extractant employed. The compositions undergoing treatment may be composed of a single metal oxide or a combination of metal oxides. Likewise, the material being treated may be a composite of a compound of a non-metal such as silicon or carbon in combination with one or more metal compounds. Thus, silica-metal oxide composites of both natural and synthetic origin may be treated in accordance with the present process. Aluminous porous solids have been found to be particularly susceptible to treatment with acetylacetone under the conditions recited herein. Thus, porous aluminum oxide compositions such as bauxite, activated alumina, and alumina gel, readily undergo treatment in accordance with the present process. Composites of alumina in combination with other metal oxides, or in combination with silica, also readily undergo chelation upon contact with acetylacetone to yield products of increased surface area. Clay cracking catalysts and silica-alumina gel composites are conveniently treated in accordance with the present process with alteration in the catalytic properties thereof. The treatment of alumina gel pellets has shown that chelation with acetylacetone does not break up the pellet even when relatively high percentages of the alumina have been removed. Thus, whole alumina gel pellets were found in treats where 83 per cent of the alumina had been dissolved by chelation. Micrometer measurements on alumina gel pellets before and after removal by acetylacetone chelation of 53 per cent $Al_2O_3$ by weight showed virtually no change in diameter. The same general tendency was also noted when spheroidal particles of chromia-alumina gel were extracted with acetylacetone. Chemical analyses of the extract and the extracted chromia-alumina gel particles showed that both chromia and alumina had been removed by the treatment. This retention of particle size and shape, as will be realized, is highly desirable in certain applications of the treated compositions.

Having described in a general way the nature of this invention, it may be more readily understood by reference to the following non-limiting examples. The data set forth in Table I below illustrate the ability of acetylacetone to dissolve and remove material from several types of porous solids. In these examples, the porous solids, after calcination at an elevated temperature, were subjected to extraction with acetylacetone for one hour employing a temperature of 284° F. (reflux temperature) and an acetylacetone/catalyst ratio of 1.5/1 by weight.

Table I

| Example | Porous Solid | Material Removed, Wt. Percent | Surface Area, Sq. m./g. | |
|---|---|---|---|---|
| | | | Before Extraction | After Extraction |
| 1 | Silica-alumina gel (10.5 Al$_2$O$_3$–89.5 SiO$_2$) | 2 | 393 | 450 |
| 2 | Magnesium oxide | 6 | 36 | 52 |
| 3 | Alumina gel | 21 | 160 | 185 |
| 4 | Bauxite | 16 | 207 | 214 |
| 5 | Chromia-alumina gel (30% Cr$_2$O$_3$–70% Al$_2$O$_3$) | 16 | 228 | 240 |
| 6 | Silica gel | Nil | 519 | 482 |

It is apparent from the foregoing data that extraction of metal oxide compositions with acetylacetone serves to increase the surface area of such compositions. In contrast to the increase in surface area observed with these compositions, corresponding treatment of silica gel failed to remove any material therefrom and brought about a decrease in surface area. Such result is undoubtedly due to the inability of silica to chelate with the acetylacetone extractant.

The effect of treating time is illustrated by the results set forth in Table II. In these examples, alumina gel pellets were employed and contact with acetylacetone was effected at a temperature of 284° F. using an acetylacetone/alumina ratio of 1.5/1 for the varying times shown.

Table II

| Example | Treatment | Material Removed, Wt. Percent | Surface Area, Sq. m./g. |
|---|---|---|---|
| | None | | 160 |
| 7 | One-hour batch | 21 | 185 |
| 8 | Four-hour batch | 27 | 196 |
| 9 | Seventeen-hour (Soxhlet Extraction) | 53 | 220 |
| 10 | Twenty-hour (Soxhlet Extraction) | 85 | 281 |

From the above data, it will be noted that the extent of extraction increases with increase in time of treatment. It is apparent that the extent of extraction may be easily controlled to give a wide variety of final products. Upon continued extraction of the gel pellets, all of the alumina would have been dissolved eventually.

A comparison of the non-aqueous acetylacetone as an extractant for alumina gel with two aqueous organic acids, namely, acetic and oxalic, is set forth in Table III. Both of the organic acids form water soluble salts while aluminum acetylacetone is insoluble in water. All of these agents increase the surface area and effect a change in the porosity characteristics. As previously mentioned hereinbefore, the attack on the gel pellets is different for acetylacetone as compared with extraction with aqueous acid solution, there being a pronounced tendency for the pellet to break and form a mud when an aqueous acid extractant is used. With the non-aqueous acetylacetone, the pellets remain intact. With calcined gel particles, there is always a tendency for the particles to disrupt into irregularly shaped fragments when wet with liquid water or water solutions. Contact of gel particles with acetylacetone does not effect such disruption.

Table III

| | Material | | |
|---|---|---|---|
| | Alumina Gel | Chromia-Alumina Gel | Silica-Alumina Gel |
| Weight Percent Extracted by:[1] | | | |
| Acetic Acid [2] | 8 | 11 | |
| Oxalic Acid [3] | 82 | 67 | 6 |
| Acetylacetone [4] | 21 | 16 | 2 |
| Surface Area, Sq. m./g.: | | | |
| As charged | 160 | 228 | 393 |
| After Acetic Acid Extraction | 172 | 252 | |
| After Oxalic Acid Extraction | 184 | 262 | 474 |
| After Acetylacetone Extraction | 185 | 240 | 450 |

[1] One-hour extraction at reflux temperatures.
[2] 5 g. material plus 20 g. glacial acetic acid plus 100 ml. H$_2$O.
[3] 5 g. material plus 15 g. oxalic acid plus 100 ml. H$_2$O.
[4] 10 g. material plus 15 g. acetylacetone (no water).

In the extraction of porous solids in accordance with the present procedure, the surface area and pore volume are normally both increased as material is leached out. The average pore diameter also increases and the particle density decreases. With unicomponent solids, the real density remains essentially constant while with a multicomponent solid, the real density may increase or decrease, depending on the density of the various components and which of the various components are removed by leaching. The pore size distribution of the porous solid will also be changed. An example of such changes is shown in the single figure of the attached drawing. The porous solid used was alumina gel. Extraction also was carried out by contacting the alumina gel pellets with acetylacetone for four hours at a reflux temperature of 284° F., using an acetylacetone/alumina gel ratio of 1.5/1. Twenty-seven per cent by weight of material was removed by such treatment. The surface characteristics of the alumina gel before and after extraction are tabulated below:

| | Before | After |
|---|---|---|
| Surface Area, Sq. m./gm | 160 | 196 |
| Particle Density, gm./cc | 1.41 | 1.09 |
| Real Density, gm./cc | 3.45 | 3.41 |
| Pore Volume, cc./gm | 0.42 | 0.62 |
| Average Pore Diameter, A° | 105 | 128 |

The surface areas were determined by the Brunauer-Emmett-Teller nitrogen method, the particle density by mercury displacement, the real density by helium displacement, while the pore volume was calculated from the reciprocals of the particle and real densities. The average pore diameters were calculated by using the pore volume and surface area. These are all well known methods for determining pore characteristics and have been described in detail in the literature. (See Ritter, H. L., and Drake, L. C., Ind. Eng. Chem., Anal. Ed., 17, 782 (1945); Drake, L. C., and Ritter, H. L., Ind. Eng. Chem. Anal. Ed., 17, 787 (1945); and Drake, L. C., Ind. Eng. Chem., 41, 780 (1949).) The above data show that the removal of 27 per cent of the alumina gel by acetylacetone increased the pore volume by 50 per cent, increased the surface area by 22 per cent, decreased the particle density by 23 per cent, and increased the average pore diameter by 22 per cent.

While the above description has been directed to a method for altering the surface characteristics of porous metal oxide compositions by extracting the same with acetylacetone, it is contemplated that in some instances it may be desirable to combine the change in porosity characteristics obtained by acetylacetone extraction described herein with subsequent or prior changes brought about by thermal or steam treatments. It is accordingly to be understood that the above description is merely illustrative of preferred embodiments of the invention, of which many variations may be made within the scope of the following claims by those skilled in the art without departing from the spirit thereof.

We claim:
1. A method for altering the surface characteristics of a porous solid metal oxide composition which comprises leaching said composition with acetylacetone.

2. A method for altering the surface characteristics of a porous solid consisting essentially of silica and at least one metal oxide which comprises leaching said solid with acetylacetone.

3. A method for altering the surface characteristics of a porous plural metal oxide solid which comprises leaching said solid with acetylacetone.

4. A method for increasing the surface area of a porous solid metal oxide composition which comprises contacting said composition with acetylacetone for at least one hour.

5. A method for increasing the surface area of a porous solid metal oxide composition which comprises contacting said composition with acetylacetone at refluxing temperature.

6. A method for altering the surface characteristics of a porous solid aluminous composition which comprises leaching said composition with acetylacetone.

7. A method for altering the surface characteristics of a porous solid comprising aluminum oxide which comprises leaching said solid with acetylacetone.

References Cited in the file of this patent

UNITED STATES PATENTS

| Number | Name | Date |
|---|---|---|
| 1,905,087 | Goebel | Apr. 25, 1933 |
| 2,055,616 | Starr | Sept. 29, 1936 |

OTHER REFERENCES

Synthetic Organic Chemicals, Carbide and Carbons Chem. Co., New York, N. Y., 1945, page 57. (Copy in Div. 64.)